(12) United States Patent
Hartung et al.

(10) Patent No.: US 7,434,090 B2
(45) Date of Patent: Oct. 7, 2008

(54) METHOD AND APPARATUS FOR JUST IN TIME RAID SPARE DRIVE POOL MANAGEMENT

(75) Inventors: Steve Fredrick Hartung, Boulder, CO (US); Kim Bang Le, Broomfield, CO (US); Aloke Guha, Louisville, CO (US)

(73) Assignee: Copan System, Inc., Longmont, CO (US)

( * ) Notice: Subject to any disclaimer, the term of this patent is extended or adjusted under 35 U.S.C. 154(b) by 473 days.

(21) Appl. No.: 10/956,177

(22) Filed: Sep. 30, 2004

(65) Prior Publication Data
US 2006/0075283 A1    Apr. 6, 2006

(51) Int. Cl.
*G06F 11/00* (2006.01)

(52) U.S. Cl. .......................................................... 714/6
(58) Field of Classification Search ................ None
See application file for complete search history.

(56) References Cited

U.S. PATENT DOCUMENTS

| | | | |
|---|---|---|---|
| 4,467,421 A | 8/1984 | White | |
| 5,088,081 A | 2/1992 | Farr | |
| 5,438,674 A | 8/1995 | Keele et al. | |
| 5,530,658 A | 6/1996 | Hafner et al. | |
| 5,557,183 A | 9/1996 | Bates et al. | |
| 5,586,250 A * | 12/1996 | Carbonneau et al. | 714/44 |
| 5,666,538 A | 9/1997 | DeNicola | |
| 5,680,579 A | 10/1997 | Young et al. | |
| 5,720,025 A | 2/1998 | Wilkes et al. | |
| 5,727,144 A | 3/1998 | Brady | |
| 5,787,462 A | 7/1998 | Hafner et al. | |
| 5,805,864 A | 9/1998 | Carlson et al. | |
| 5,828,583 A | 10/1998 | Bush et al. | |
| 5,875,456 A * | 2/1999 | Stallmo et al. | 711/114 |
| 5,913,927 A | 6/1999 | Nagaraj et al. | |
| 5,917,724 A | 6/1999 | Brousseau et al. | |
| 5,961,613 A | 10/1999 | DeNicola | |
| 6,078,455 A | 6/2000 | Enarson et al. | |
| 6,128,698 A | 10/2000 | Georgis | |
| 6,401,214 B1 * | 6/2002 | Li | 714/6 |
| 6,598,174 B1 * | 7/2003 | Parks et al. | 714/6 |
| 6,625,750 B1 * | 9/2003 | Duso et al. | 714/11 |
| 6,680,806 B2 | 1/2004 | Smith | |

(Continued)

OTHER PUBLICATIONS

LSI Logic MegaRAID SCSI 320-2E Controller; Quick Hardware Setup Guide; DB11-000055-00, Version 1.0, Aug. 2004; © 2004 by LSI Logic Corporation; pp. 1-3.

(Continued)

*Primary Examiner*—Christopher S McCarthy
(74) *Attorney, Agent, or Firm*—Brian N. Young; Charles J. Kulas; Trellis IP Law Group, PC (57) ABSTRACT

Spare disk drive management in a storage system. The storage system comprises disk drives and spare disk drives. Spare disk drives are initially kept in power-off state. The storage system detects the failure of a disk drive and selects a spare disk drive to replace the failed disk drive. The spare disk drive is selected on the basis of spare selection criteria. The selected spare disk drive is powered-on and replaces the failed disk drive. Data on the failed disk drive can be reconstructed on the spare disk drive by using RAID parity techniques.

20 Claims, 10 Drawing Sheets

U.S. PATENT DOCUMENTS

| | | | |
|---|---|---|---|
| 6,735,549 | B2 | 5/2004 | Ridolfo |
| 6,771,440 | B2 | 8/2004 | Smith |
| 6,816,982 | B2 | 11/2004 | Ravid |
| 6,871,295 | B2 * | 3/2005 | Ulrich et al. .................... 714/6 |
| 6,892,276 | B2 * | 5/2005 | Chatterjee et al. ........... 711/114 |
| 6,957,291 | B2 * | 10/2005 | Moon et al. ................. 710/302 |
| 6,959,399 | B2 | 10/2005 | King et al. |
| 6,976,134 | B1 * | 12/2005 | Lolayekar et al. ........... 711/148 |
| 6,982,842 | B2 | 1/2006 | Jing et al. |
| 6,986,075 | B2 * | 1/2006 | Ackaret et al. ................. 714/4 |
| 6,990,547 | B2 * | 1/2006 | Ulrich et al. ................ 710/304 |
| 7,035,972 | B2 | 4/2006 | Guha et al. |
| 7,107,491 | B2 | 9/2006 | Graichen et al. |
| 7,210,005 | B2 | 4/2007 | Guha et al. |
| 7,266,668 | B2 | 9/2007 | Hartung et al. |
| 2002/0007464 | A1 | 1/2002 | Fung |
| 2002/0062454 | A1 | 5/2002 | Fung |
| 2002/0144057 | A1 | 10/2002 | Li et al. |
| 2003/0196126 | A1 | 10/2003 | Fung |
| 2003/0200473 | A1 | 10/2003 | Fung |
| 2004/0006702 | A1 | 1/2004 | Johnson |
| 2004/0103246 | A1 * | 5/2004 | Chatterjee et al. ........... 711/114 |
| 2004/0111251 | A1 | 6/2004 | Trimmer et al. |
| 2004/0153614 | A1 | 8/2004 | Bitner et al. |
| 2004/0260967 | A1 | 12/2004 | Guha et al. |
| 2005/0060618 | A1 | 3/2005 | Guha |
| 2005/0177755 | A1 | 8/2005 | Fung |
| 2005/0210304 | A1 | 9/2005 | Hartung |
| 2006/0053338 | A1 | 3/2006 | Cousins |
| 2006/0090098 | A1 | 4/2006 | Le |
| 2007/0028041 | A1 | 2/2007 | Hallyal et al. |
| 2007/0079172 | A1 * | 4/2007 | Rowe et al. .................... 714/6 |
| 2007/0220316 | A1 | 9/2007 | Guha et al. |

OTHER PUBLICATIONS

Asaca/Shibasoku Corp of America, publication DM200, 1 page from www.asaca.com/DVL/DM_200.htm, Oct. 7, 2003.

Colarelli et al., The Cas for Massive Arrays of Idle Disks (MAID), Dept of Computer Science, Univ. of Colorado, Boulder, pp. 1-6, Jan. 7, 2002.

Patterson et al., "A Case for Redundant Arrays of Inexpensive Disks (RAID)," ACM, pp. 109-116, 1998.

Chase et al., "Managing Energy and Server Resources in Hosting Centers," Dept of Computer Science, Duke University, pp. 14, Oct. 2001.

Calce and the University of Maryland; Reliability of Hard Disk Drives (HDD); © 2003; pp. 1-2; www.calce.umd.edu.

Herbst, Jim; Smart Specification For Seagate Technology Desktop and Mobile Drives Version 2.28; Apr. 23, 2003; pp. 1-36.

S.M.A.R.T Design Deskip HDD Development IDE HDD Development Storage M & D; Jul. 12, 2002; IBM Corporation.

Weikal, Adam et al.; Maxtor Self-Monitoring, Analysis and Reporting Technology/ Drive Self Test (SMART/ DST) User's Guide; Revision C; May 1, 2002; pp. 1-52.

\* cited by examiner

METHOD AND APPARATUS FOR JUST IN TIME RAID SPARE DRIVE POOL MANAGEMENT

BACKGROUND

The present invention relates generally to the field of storage systems. More particularly, the present invention relates to the use of spare disk drives in storage systems comprising a Redundant Array of Independent Disks (RAID).

Storage systems are being increasingly used to store large amounts of data and decrease the processing undertaken by data processing systems in the storage of data. Storage systems comprise one or more storage devices, such as magnetic hard disk drives, tape drives, and the like. Storage systems also use special hardware to control these storage devices and reduce the processing undertaken by data processing systems in storing data. Storage systems either are connected to a data processing system or are used in a network environment, in which they are connected to a plurality of data processing systems by means of a network interface.

Traditionally, storage systems use high-performance storage devices. These storage devices are very expensive and, therefore, the overall cost of a storage system employing these storage devices is very high. This makes the use of such storage systems prohibitive, especially where cost is a key factor in deciding the deployment of storage systems. In contrast, in a Redundant Array of Independent Disks (RAID), a technique that is used in storage systems, a number of inexpensive disk drives are combined to improve the performance and reliability of a storage system at a lower cost, in contrast to traditional storage systems, which use high-performance storage devices.

Storage systems that utilize RAID techniques, or RAID systems, use a number of disk drives that are used to emulate one or more high-capacity, high-performance storage devices. RAID systems are based on various levels of RAID. A RAID engine is used in hardware or software form to carry out the processing required for the implementation of RAID techniques in a storage system. RAID systems also improve reliability of data by providing data striping and data parity protection. In order to store data reliably, RAID systems use spare disk drives that replace failed disk drives. This maintains the reliability of the system by ensuring that a drive is available, in the case of failure of an existing drive.

Initially, failed drives in RAID systems were manually replaced with spare drives. Failed drives can be replaced either by powering-off the entire RAID system or by 'hot-swapping' the failed drive. 'Hot-Swapping' is a technique that enables the removal or addition of a disk drive to a storage system without powering-off the system. 'Hot-swapping' reduces the downtime of the RAID system by enabling the RAID system to run even when a failed disk drive is being replaced. However, 'hot-swapping' in RAID systems is a tedious process and there might not always be a person around to replace the failed disk drive. This might lead to a decrease in the reliability of the RAID system because there can be a time gap between the failure of a disk drive and its replacement.

In order to overcome the dependence of 'hot-swapping' on manual intervention, RAID systems employ spare disk drives that are always available in the RAID system. For example, a spare disk drive can be maintained in a power-on or 'hot' condition. When a disk drive fails, the 'hot' spare disk drive is used in place of the failed disk drive. Data on the failed disk drive is reconstructed on the spare disk drives by using RAID parity techniques.

However, the above-mentioned system suffers from one or more drawbacks or limitations. It keeps the spare disk drives always 'hot', or in a power-on state. Disk drives have a fixed life, in terms of hours, before they fail. Since the spare disk drives are always 'hot', even when they are in use, the life of the spare disk drives is reduced. The spare disk drives also consume electrical power, which might over the long run, become an unnecessary expenditure. Hence, such systems do not attain the required level of reliability and involve increased power consumption.

To avoid the above-mentioned drawbacks or limitations, spare disk drives can be maintained in a power-off state in a storage system. The spare disk drive is powered on, or made 'hot', when a disk drive failure is detected and made to replace the failed disk drive. Such a system selectively powers on spare disk drives when it receives an indication of failure of a disk drive. Data is reconstructed on the spare disk drive to restore the original fault tolerance of the system.

However, the spare disk drive selected to replace a failed disk drive might not be the optimum spare disk drive in terms of its effect on data bus loads, power bus loads, and environmental conditions. In addition, the failure of a drive is not intercepted and the RAID engine needs to intervene to respond to the failure. This causes an increased overhead on the RAID engine to perform the processing required to respond to the failed disk drive.

SUMMARY

Embodiments of the invention optimally select a spare disk drive to replace a failed disk drive. A preferred embodiment handles replacement of drives without any intervention of the RAID engine of a RAID system. Spare disk drives are selected to replace failed disk drives on the basis of criteria that select the optimum spare disk drive.

One feature of an embodiment includes replacing failed disk drives in the storage system on a "just in time" basis to minimize the time and the amount of data that is not covered by parity protection due to the failure of the disk drive.

A preferred embodiment is directed towards a method and a system of spare disk drive management in a storage system. The storage system comprises a first set of disk drives that are in power-on state and a second set of disk drives in a power-off state. A processor detects the failure of a disk drive belonging to the first set of disk drives in the storage system. It then selects a spare disk drive from the second set of disk drives to replace the failed disk drive. The spare disk drive is selected on the basis of specified spare selection criteria. The spare selection criteria comprise evaluation of the impact of the spare disk drive on data bandwidth and power loads on the first set of disk drives, and an evaluation of the environmental conditions in the vicinity of the spare disk drive. If the spare disk drive meets the spare selection criteria, it is powered-on and it replaces the failed disk drive. If it does not meet the spare selection criteria, then another spare disk drive from the second set of disk drives is selected and evaluated to determine if it meets the spare selection criteria. The process is repeated until a spare disk drive meets the spare selection criteria.

Data on the failed disk drive is regenerated on the selected spare disk drive with the help of RAID parity techniques. The spare disk drive is then used for all data read/write operations that would be otherwise directed to the failed disk drive. Spare disk drives are maintained in a power-off condition. The spare disk drives are powered-on only after the detection of failure of a disk drive. This reduces the overall power consumption of the storage system. Since the spare disk drives are in a power-off condition, their life is increased as compared to systems that maintain spare disk drives in power-on condition. Additionally, since the spare disk drives are selected on the basis of spare selection criteria, optimum operating conditions such as bus loads, power loads, and environmental conditions are maintained in the storage system.

BRIEF DESCRIPTION OF THE DRAWINGS

Various embodiments of the invention will hereinafter be described in conjunction with the appended drawings provided to illustrate and not to limit the invention, wherein like designations denote like elements, and in which.

DESCRIPTION OF PREFERRED EMBODIMENTS

For the sake of convenience, the terms used to describe the various embodiments are defined below. It should be noted that these definitions are provided to merely aid the understanding of the description, and that they in no way limit the scope of the invention.

RAID—RAID is a storage architecture that enables high-capacity, high-speed data transfer at a low cost. A description of RAID can be found in the paper titled "A Case for RAID" by Patterson, et al, proceedings of the 1988 ACM SIGMOD International Conference On Management Of Data, p. 109-116, Jun. 1-03, 1988, Chicago, Ill., United States.

Spare Drive—A spare drive includes a disk drive that is not being currently used for any data read/write operation and is intended to replace a disk drive that has failed or has been predicted to fail. It may be in a power-on or a power-off state.

Embodiments of the invention include a method and an apparatus for replacing failed disk drives with spare disk drives in a storage system. The spare disk drives are initially in a power-off condition. When the failure of a disk drive is detected by the system, the failed disk drive is powered-off and a spare disk drive is selected to replace the failed disk drive. The selected spare disk drive is powered-on and the failed disk drive is replaced with the spare disk drive. The selection of the spare disk drive is based on conditions such as data bus loads, power bus loads, and environmental conditions on the storage system.

Figure 1:
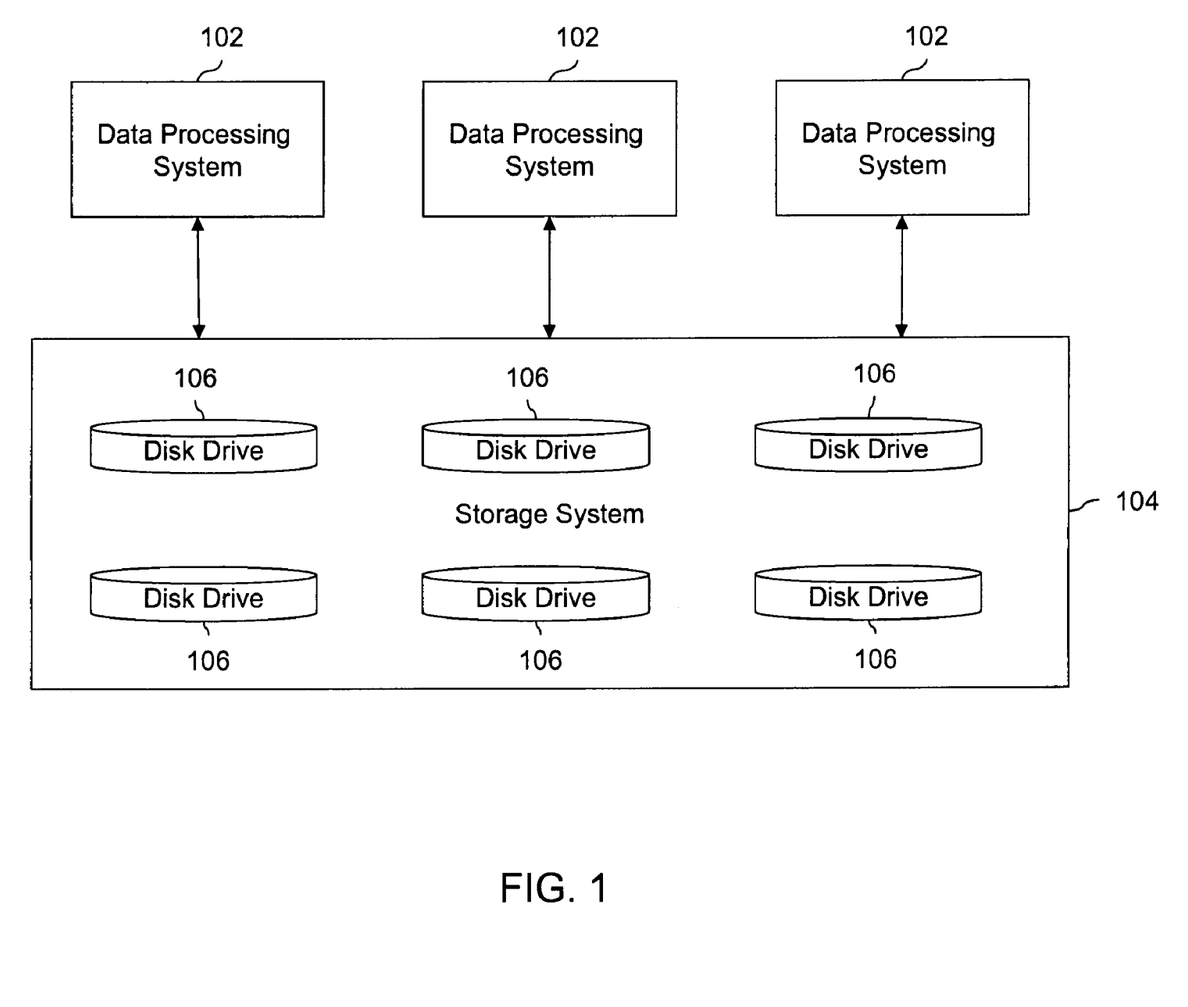
FIG. 1 is a block diagram of an exemplary storage system and its environment, in accordance with an embodiment of the present invention.

FIG. 1 is a block diagram of an exemplary storage system and its environment, in accordance with an embodiment of the present invention. One or more data processing systems 102 are connected to a storage system 104. Data-processing systems 102 can be in the form of computer servers, stand-alone desktop computers, PCs, workstations and the like. Data processing systems 102 can be connected to storage system 104 directly, by using a network such as a Local Area Network (LAN), Wide Area Network (WAN), or a Wireless network. The storage system comprises a plurality of disk drives 106. Disk drives 106 can be in the form of magnetic disk drives, tape drives, optical drives or any other type of data storage device, system or medium. The examples of a data-processing system, the means for connecting data processing systems to storage system and disk drives cited here are only for illustrative purposes and do not limit the scope of the invention, as will be apparent to one skilled in the art.

Figure 2:
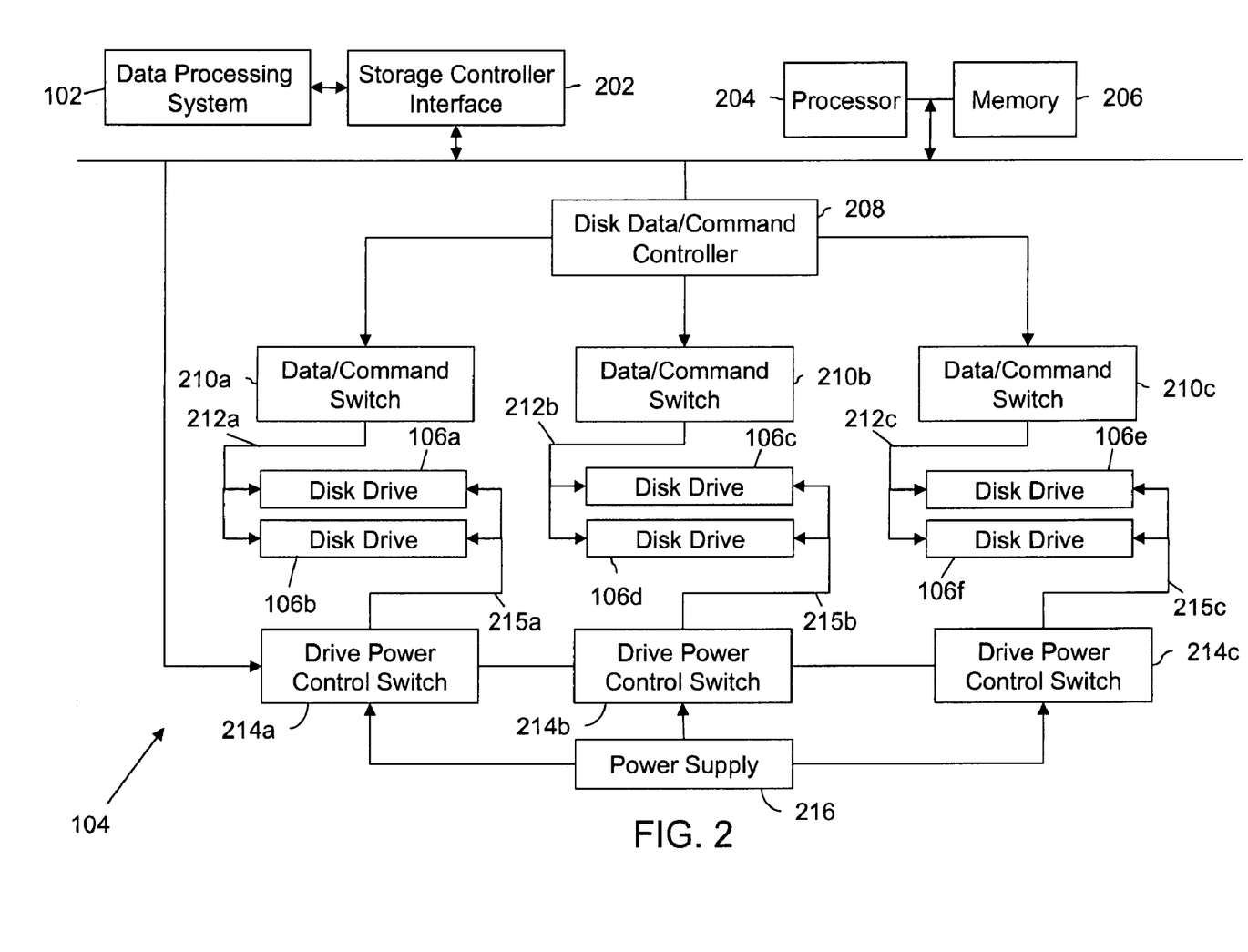
FIG. 2 is a block diagram of the storage system, in accordance with an embodiment of the present invention.

FIG. 2 is a block diagram of the storage system, in accordance with an embodiment of the present invention. A storage controller interface 202 receives data from data processing system 102. Examples of storage controller interface 202 include Fibre Channel Interface, SCSI host adapter, SATA Interface, and iSCSI host adapter. Storage controller interface 202 is used to connect one or more data processing systems 102 to storage system 104. The data/command received by storage controller interface 202 is processed by a processor 204. Processor 204 is connected to storage controller interface 202 by means of a bus. Processor 204 is also connected to a memory 206. Memory 206 is used to temporarily store and process the data/commands received by processor 204. Processor 204 is encoded with instructions for providing RAID functionalities such as data striping, data mirroring, and data parity protection. Processor 204 is used to detect the failure of a disk drive and select a spare disk drive to replace the failed disk drive. Processor 204 sends data to a disk data/command controller 208. In an embodiment, disk data/command controller 208 is a hardware-based protocol interface. Disk data/command controller 208 formats and sends the data/commands, depending on the storage protocol used, to data/command switches 210. Disk data/command controller 208 is connected to a plurality of data/command switches 210a, 210b, and 210c. Disk data/command controller 208 sends data/commands to the data/command switch corresponding to the disk drive to which data/commands have to be routed.

Disk drives 106 are connected to data/command switches 210 by means of a bus 212. Bus 212 can be in the form of a SCSI bus, IDE bus, SATA bus, etc. Disk drives 106a and 106b are connected by means of a single bus 212a to data/command switch 210a. A number of such busses, 212a-212c, are used to connect a large number of disk drives to disk data/command controller 208 via data/command switches 210. Data/Command switch 210 routes data/commands to the appropriate disk drive depending on a physical drive address supplied by processor 204. It multiplexes a single data bus to enable multiple disk drives to use the same bus. For example, consider the case in which disk data/command controller 208 receives data that is to be written on disk drive 106b. Disk data/command controller 208 routes the data to data/command switch 210a as the switch is connected to disk drive 106b. Data/Command switch 210a receives data and forwards it to disk drive 106b.

Disk drives 106 are programmed to be powered-on and powered-off individually. This is achieved by controlling the supply of power to disk drives 106 by means of drive power control switches 214. Drive power control switches 214 are connected to processor 204, which sends commands to drive power control switches 214 to either power-on or power-off one or more disk drives. Drive power control switches 214 are also connected to power supply 216 and to disk drives by power busses 215. Based on the input from processor 204, drive power control switch can selectively apply or remove power to the disk drives that are connected to that particular drive power control switch. For example, drive power control switch 214a controls power to disk drives 106a and 106b via power busses 215. Power supply 216 is adapted to supply power to disk drives 106.

Figure 3:
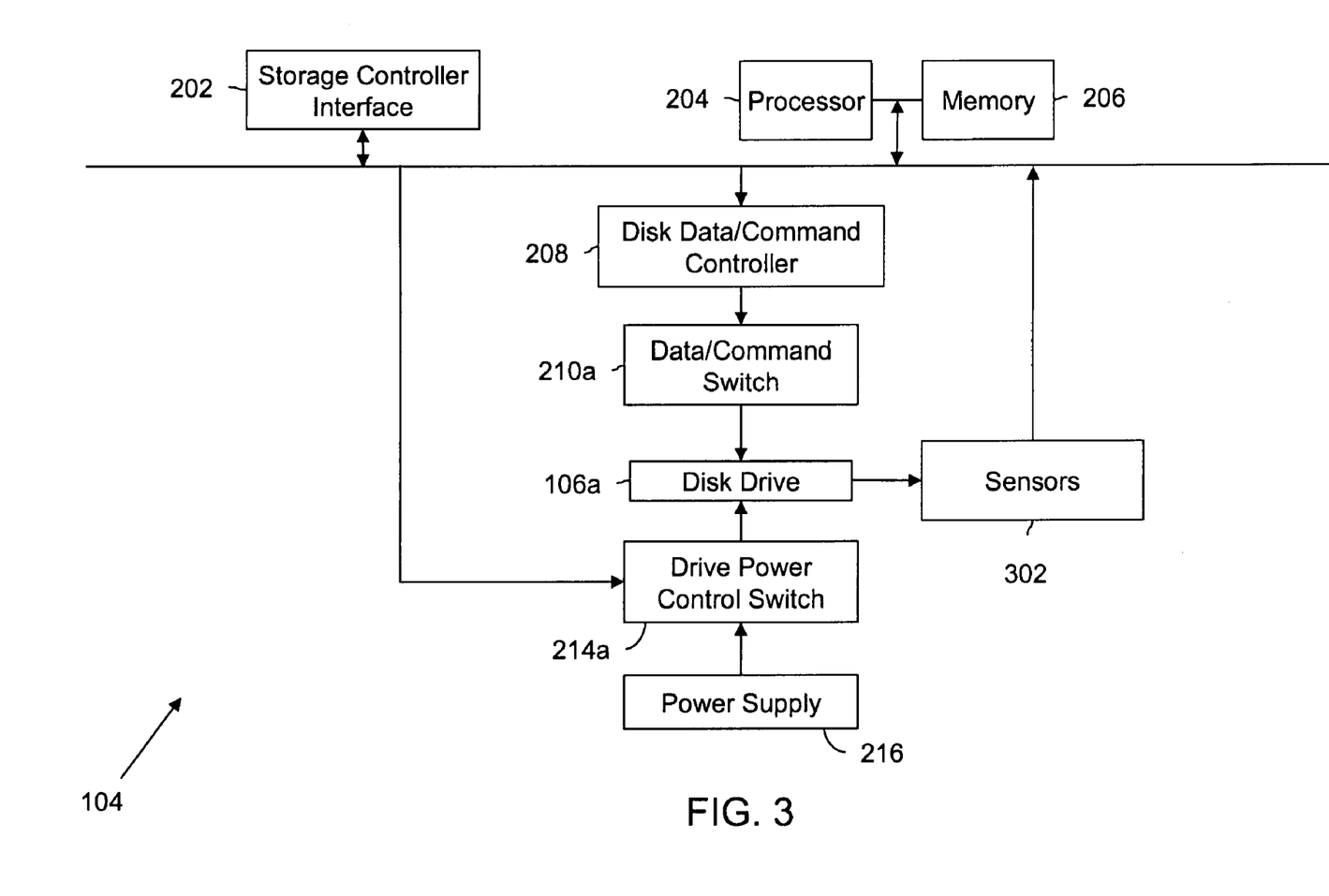
FIG. 3 is a block diagram of the storage system, showing sensors connected to an individual disk drive, in accordance with an embodiment of the present invention.

Disk drives 106 contain internal sensors that are accessible by processor 204 via data/command controller 208 and data/command switches 210. Additional sensors are mounted in the system in the vicinity of disk drives 106 and are connected to registers that are accessible to processor 204. The sensors monitor the temperature and vibrations in the vicinity of disk drives 106. FIG. 3 is a block diagram of the storage system, showing sensors connected to an individual disk drive, in accordance with an embodiment of the present invention. Sensors 302 monitor the temperature and vibrations in the vicinity of disk drive 106a. In an embodiment of the present invention, sensors 302 are placed in the vicinity of disk drives 106 in the storage system. Processor 204 accesses data about the temperature and vibrations by reading the contents of the registers associated with sensors 302. This data is used by processor 302 to select a spare disk drive for replacing a failed disk drive. Apart from temperature and vibrations, processor 302 selects a spare disk drive based on bus loads and power loads on disk drives in the storage system. Processor 302 uses spare selection criteria to determine if a spare disk drive is suitable to replace the failed disk drive. In an embodiment of the present invention, register accessible temperature sensors and register accessible accelerometers are used to monitor the drive temperature and vibrations. It should be apparent to one skilled in the art that environmental factors such as temperature and vibrations are for illustrative purposes only and any other criteria including drive characteristics, measured or recorded events, status, etc.; environmental factors, manually or automatically set parameters, etc., can be used in the spare selection criteria without deviating from the scope of the invention.

In an embodiment of the present invention, processor 204 is programmed to carry out a plurality of tasks such as providing RAID functionalities, detecting failure of a disk drive, selecting a spare disk drive to replace the failed disk drive and carrying out the replacement by electronically powering-on and powering-off disk drives in the storage system. These tasks are carried out by different functional elements in processor 204.

Figure 4:
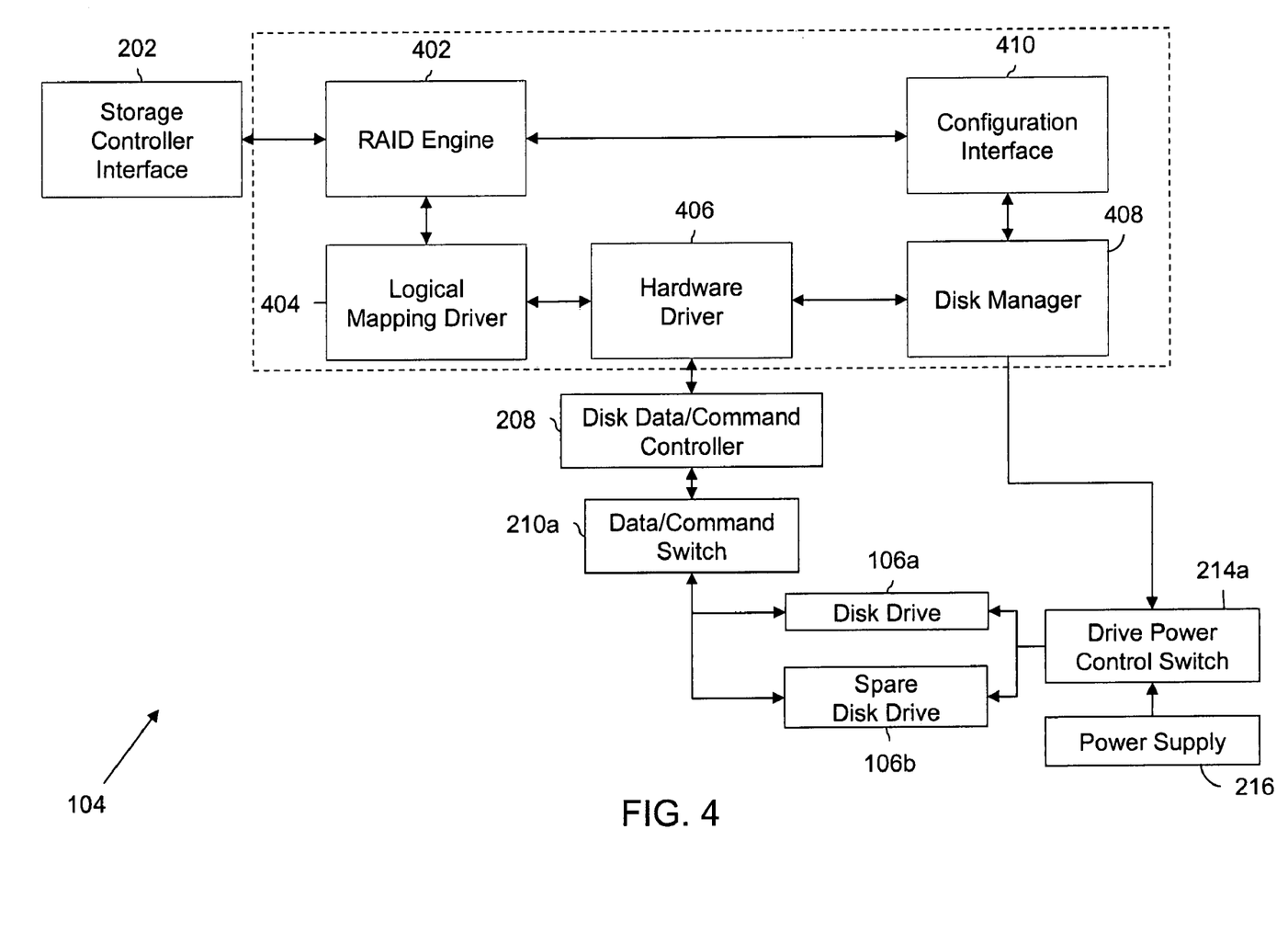
FIG. 4 is a block diagram of the main functional elements of a storage system, in accordance with an embodiment of the present invention.

FIG. 4 is a block diagram of the main functional elements of a storage system, in accordance with an embodiment of the present invention. Processor 204 comprises a RAID engine 402, a logical mapping driver 404, a hardware driver 406, a disk manager 408 and a configuration interface 410. RAID engine 402 receives data from storage controller interface 202. RAID engine 402 performs striping and parity operations on the data. It also adds a drive handle number to the data. The drive handle number is a logical identifier that specifies the drive to which the data is to be sent. RAID engine 402 sends the data to logical mapping driver 404.

Logical mapping driver 404 translates the drive handle number to a physical hardware compatible address. The physical hardware compatible address is a unique address that identifies each disk drive in the storage system. Logical mapping driver sends the physical hardware compatible address, along with the data to be written, to hardware driver 406.

Hardware driver 406 sends data to the disk data/command controller 208. In case of failure of disk drive on which data is to be written, hardware driver 406 sends a command, along with the physical hardware compatible address of the failed disk drive, to disk manager 408.

Disk manager 408 uses spare selection criteria to select a spare disk drive to replace the failed disk drive. Disk manager 408 sends commands to drive power control switch to power-on the selected spare disk drive and power-off the failed disk drive. The working of logical mapping driver 404, hardware driver 406, disk manager 408 and configuration interface 410 will be explained in detail in conjunction with FIGS. 5, 6, 7, and 8.

Figure 5:
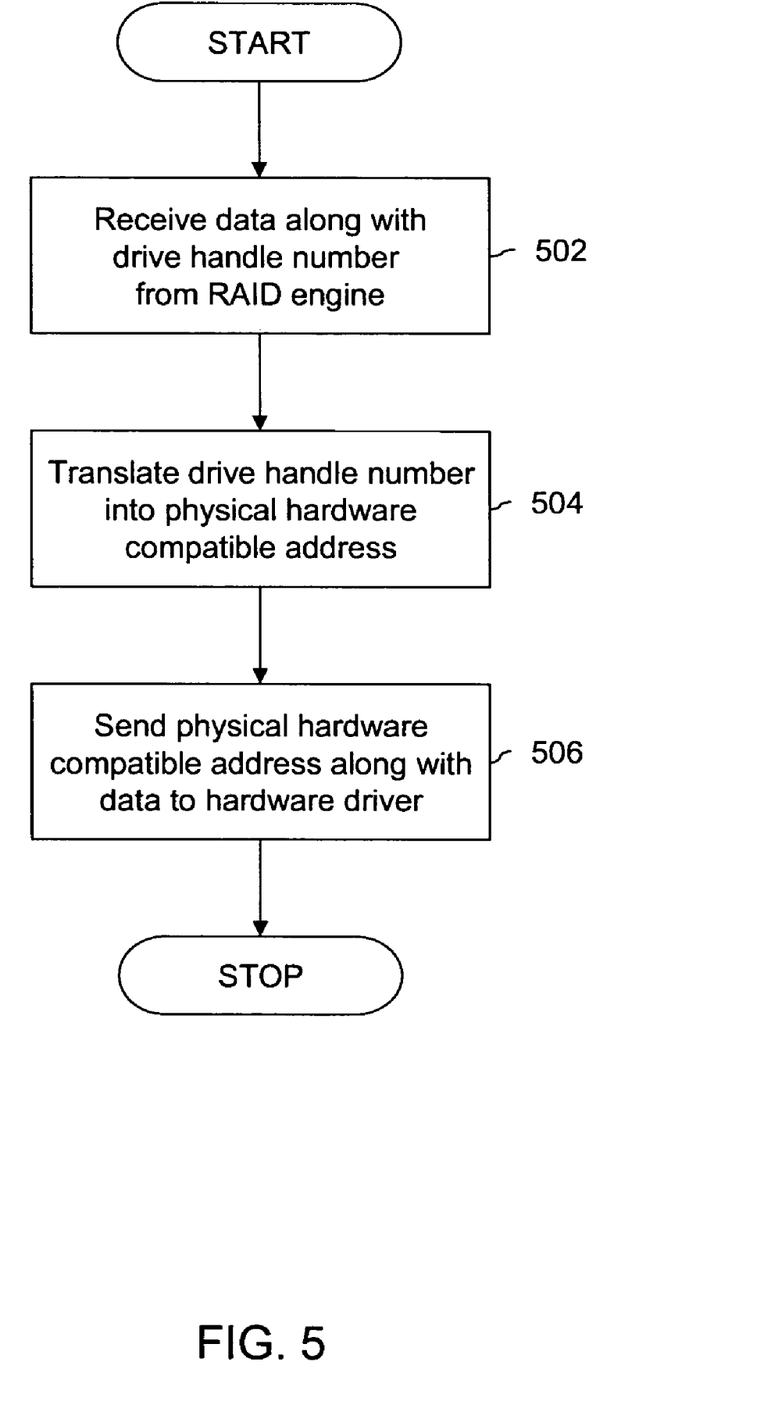
FIG. 5 is a flowchart illustrating the steps performed by a logical mapping driver, in accordance with an embodiment of the present invention.

FIG. 5 is a flowchart illustrating the steps performed by logical mapping driver 404, in accordance with an embodiment of the present invention. At step 502, data and drive handle number sent by RAID engine 402 is received by logical mapping driver 404. Logical mapping driver 404 maintains a table of drive handle numbers and corresponding physical hardware compatible addresses of disk drives in the system. In step 504, logical mapping driver 404 translates a drive handle number to its corresponding physical hardware compatible address. The physical address, along with the data, is sent to hardware driver 406 at step 506.

Figure 6:
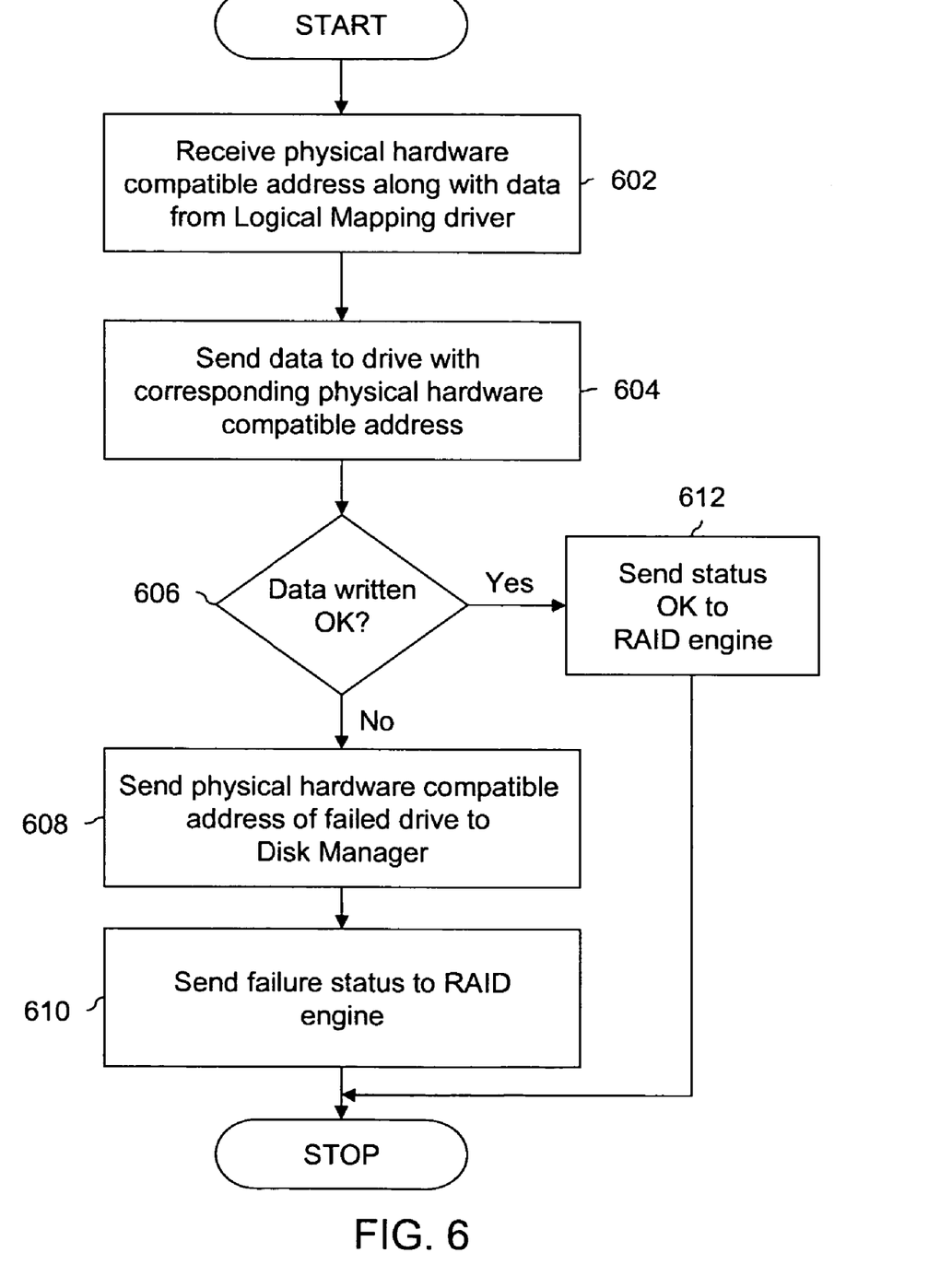
FIG. 6 is a flowchart illustrating the steps performed by a hardware driver, in accordance with an embodiment of the present invention.

FIG. 6 is a flowchart illustrating the steps performed by hardware driver 406, in accordance with an embodiment of the present invention. At step 602, hardware driver 406 receives data, along with the physical hardware compatible address of the disk drive to which the data is to be sent. At step 604, Data is sent to disk data/command controller 208. At step 606, hardware driver 406 checks if data is not written on the specified disk drive due to failure of the disk drive. In case failure is detected, hardware driver 406 sends the physical hardware compatible address of the failed disk drive to disk manager 408, at step 608. Additionally, hardware driver 406 waits until the failed disk drive is replaced with a spare disk drive. In step 610, hardware driver 406 sends a command to RAID engine 402 intimating about failure of a disk drive and not to process further read/write requests. This ensures that the failed disk drive is replaced just in time before additional read/write requests are directed to the failed disk drive. In case there is no error in the disk drive, a status 'OK' is sent to RAID engine 402, at step 612. This indicates to RAID engine 402 that it can send the next set of data.

Figure 7:
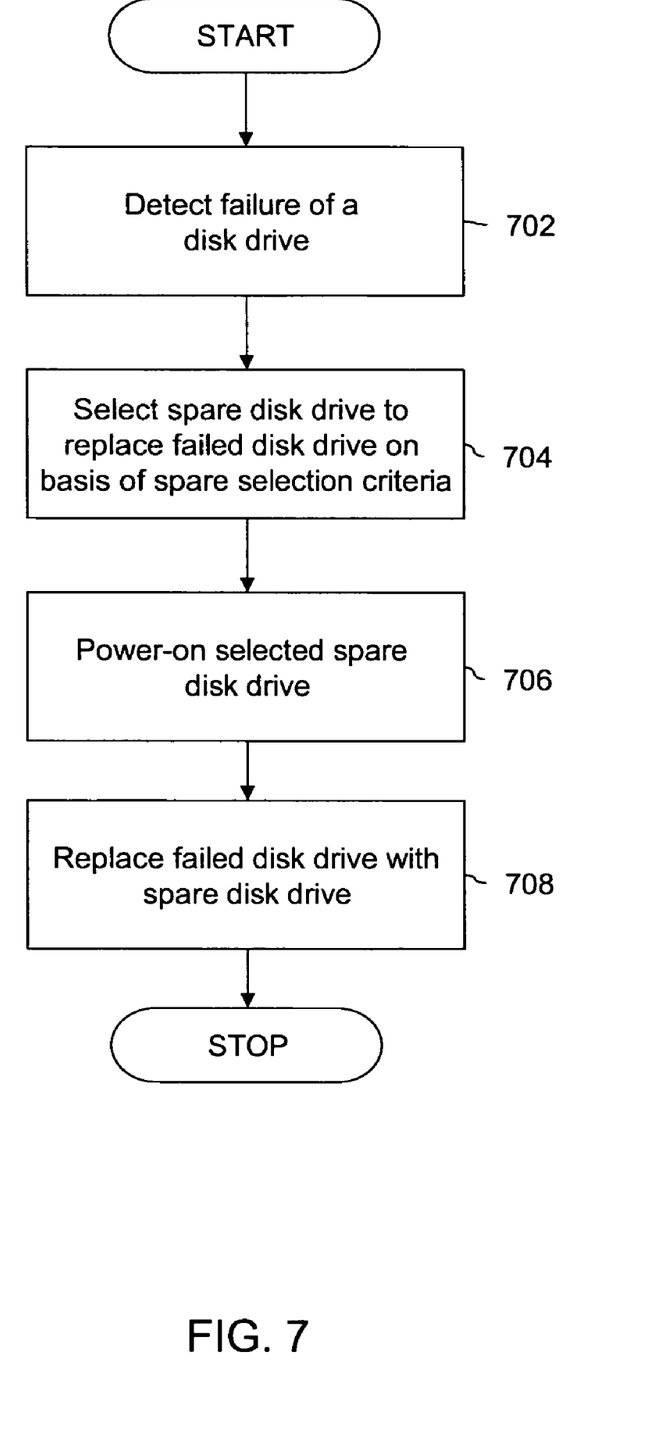
FIG. 7 is a flowchart illustrating the steps performed by a disk manager, in accordance with an embodiment of the present invention.

FIG. 7 is a flowchart illustrating the steps performed by disk manager 408, in accordance with an embodiment of the present invention. At step 702, disk manager 408 detects failure of a disk drive. In one embodiment, a failure is detected when disk manager 408 receives the physical hardware compatible address of the failed disk drive. Disk manager 408 then sends a command to drive power control switch 214, to which the failed disk drive is connected, to turn off the failed disk drive. After powering-off the failed disk drive, disk manager 408 selects a spare disk drive to replace the failed disk drive based on the spare selection criteria, at step 704. Disk manager 408 maintains a list of physical hardware compatible addresses of spare drives. In an embodiment, this list is initialized during the first operation of the storage system and is maintained on one or more disk drives to prevent loss of data during power failure. This list is checked to see if there is a spare disk drive available. In case there is no spare disk drive available, disk manager 408 sends a bad status signal to RAID engine 402 via configuration interface 410, at step 708. In this case, the storage system goes critical and it may not be possible to reconstruct data in the event of additional disk drive failures.

If spare disk drives are available, disk manager 408 selects a disk drive, from the list of available disk drives, which matches the spare selection criteria. The physical hardware compatible address of the selected spare disk drive is sent to drive power control switch 214, which is connected to the selected spare disk drive to power-on the selected spare, at step 706. The selected spare disk drive is also removed from the list of available spare drives that is maintained by disk manager 408. In an embodiment of the present invention, drive power control switch 214 is connected to a set of disk drives, in both power-on as well as power-off state. Drive power control switch controls power to disk drives via Field Effect Transistors (FETs). The FETs are controlled by registers on drive power control switch 214 that can be addressed by disk manager 408. Bit fields in the register translate directly to the power state of each individual drive that is connected to drive power control switch 214. After the selected spare disk drive is powered-on, the spare is also registered with RAID engine 402 and the selected spare disk drive replaces the failed disk drive. This process is shown as step 708.

Figure 8:
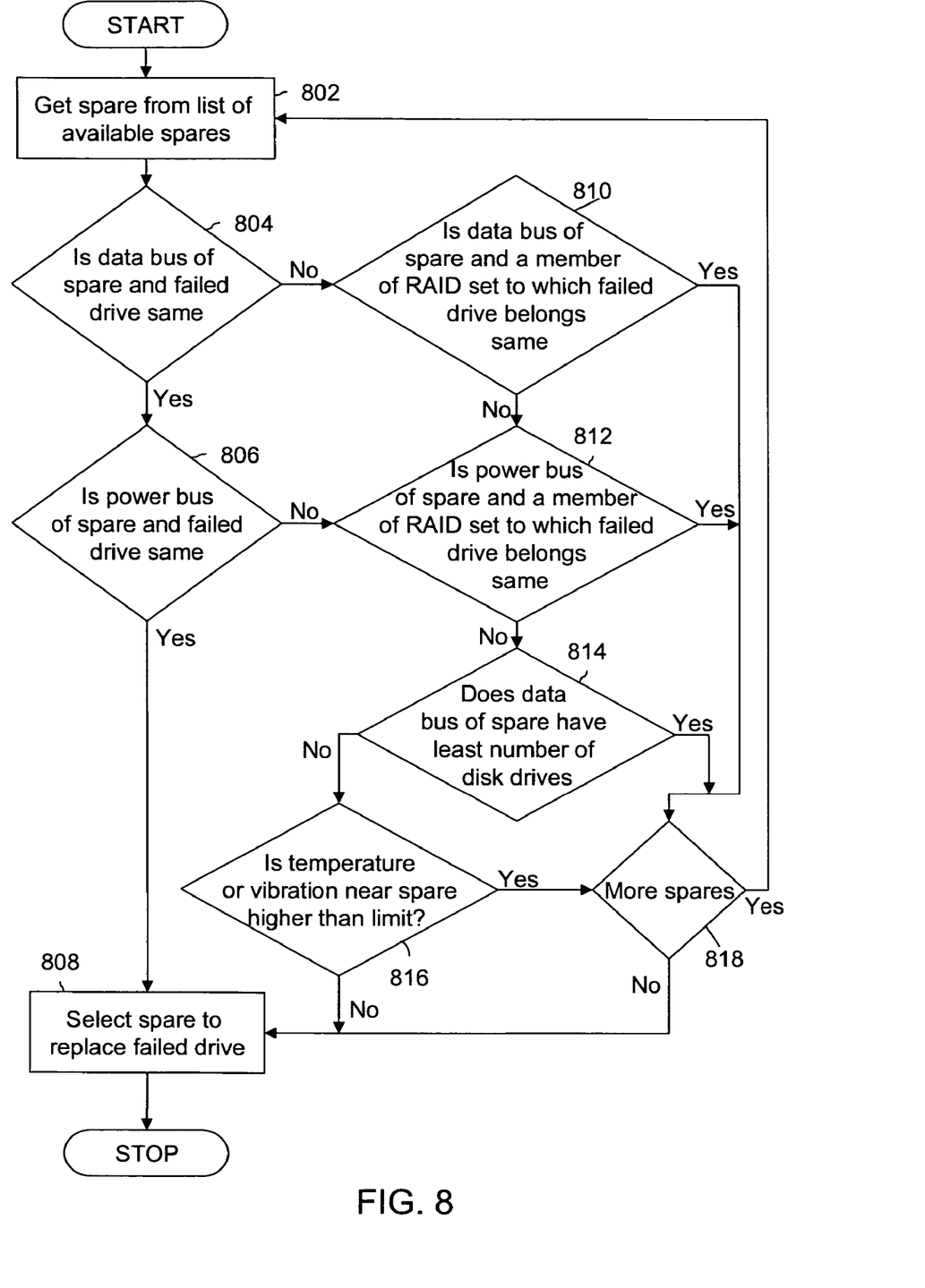
FIG. 8 is a flowchart illustrating the steps performed to select a spare disk drive on the basis of the spare selection criteria, in accordance with an embodiment of the present invention.

FIG. 8 is a flowchart illustrating the steps performed to select a spare disk drive on the basis of the spare selection criteria, in accordance with an embodiment of the present invention. At step 802, disk manager 408 selects one candidate spare disk drive from a list of available spare disk drives. The suitability of the candidate spare disk drive to replace a failed disk drive is checked by the spare selection criteria. In step 804, disk manager 408 checks if the candidate spare disk drive is on the same data bus as the failed disk drive. If this is the case, then disk manager 408 performs step 806, otherwise it performs step 810. In step 806, disk manager 408 checks if the candidate spare drive is on the same power bus as the failed disk drive. If both the candidate spare drive and the failed drive are on the same power bus, disk manager 408 performs step 808. In step 808, the candidate spare drive is selected to replace the failed disk drive. Disk manager 408 sends the hardware compatible physical address of the candidate spare drive to configuration interface 410 to replace the failed disk drive with the selected candidate spare drive.

In case the candidate spare drive and the failed drive are not on the same data bus, then disk manager 408 performs step 810. In step 810, disk manager 408 checks if the candidate spare drive is on the same data bus as any of the other members of the RAID set to which the failed disk drive belongs. If the candidate spare drive does not share the data bus with any other member of the RAID set to which the failed drive belongs, then disk manager 408 performs step 812, otherwise it performs step 818. At step 812, disk manager 408 checks if the candidate spare drive is on the same power bus as a member of the RAID set to which the failed disk drive belongs. If the candidate spare drive does not share the power bus with any other member of the RAID set to which the failed drive belongs, then disk manager 408 performs step 816, otherwise it performs step 818. In step 816, disk manager 408 checks if temperature or vibrations in the vicinity of the candidate spare drive are higher than preset values. If they are lower than the preset values, then disk manager 408 selects the candidate spare drive to replace the failed disk drive, at step 808. If the temperature or vibrations are higher than the preset values, then disk manager 408 performs step 818. In an embodiment of the present invention, the preset values are determined on the basis of disk drive specifications supplied by the manufacturers of disk drives 106.

At step 818, disk manager 408 checks if more spares, which can be selected as candidate spare drives to check for their suitability as a replacement for the failed disk drive, according to the spare selection criteria, are available. If no more spare disk drives are available, disk manager selects the candidate spare drive to replace the failed disk drive, as shown in step 808. If more spare drives are available, disk manager 408 selects another spare from the list of available spare disk drives as a candidate, at step 802.

Figure 9:
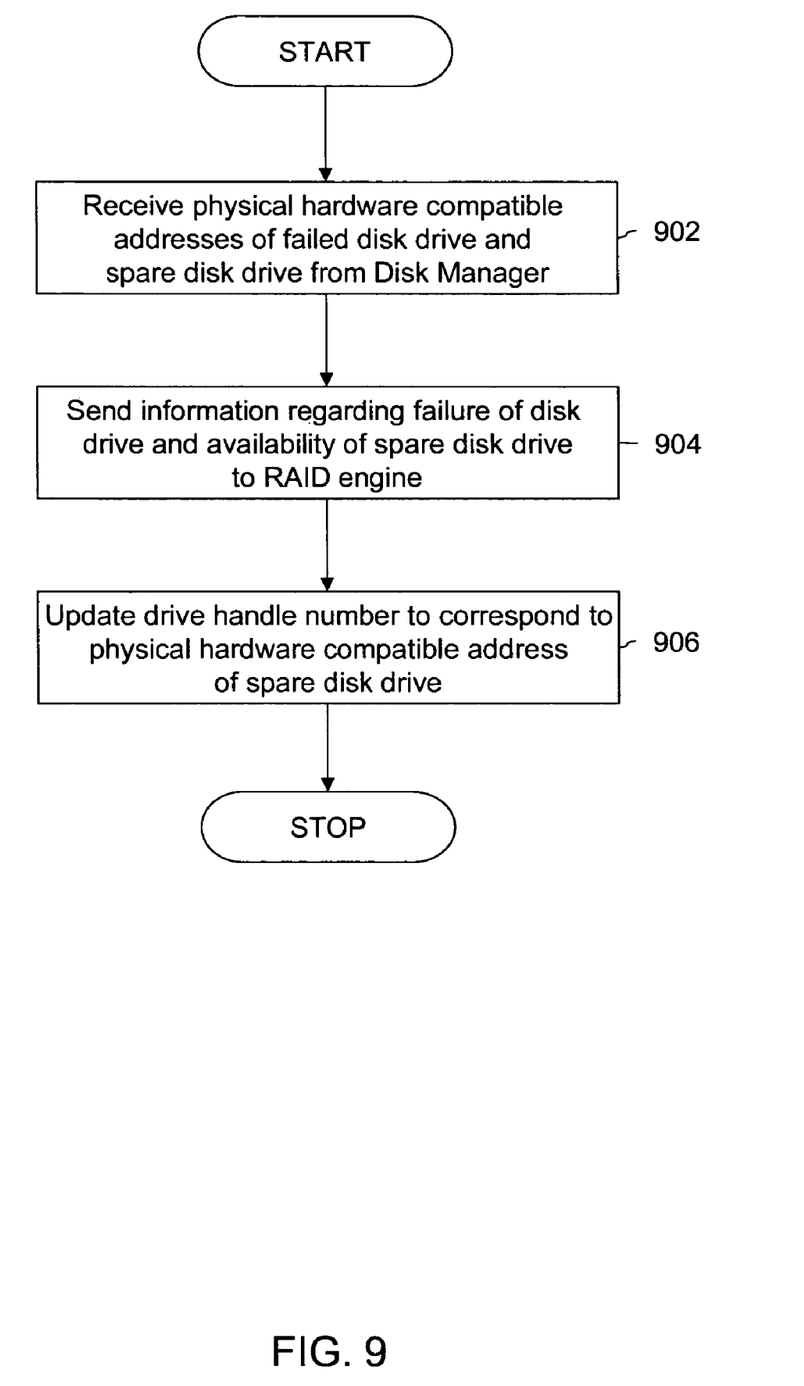
FIG. 9 is a flowchart illustrating the steps performed to replace a failed disk drive with a spare disk drive, in accordance with an embodiment of the present invention.

After disk manager 408 selects a spare disk drive to replace a failed disk drive, the spare disk drive is powered on. The spare disk drive then replaces the failed disk drive. FIG. 9 is a flowchart illustrating the steps performed in replacing a failed disk drive with a spare disk drive, in accordance with an embodiment of the present invention. At step 902, configuration interface 410 receives the physical hardware compatible address of the selected spare disk drive from disk manager 408. Configuration interface 410 sends information about the availability of a spare disk drive to RAID engine 402, at step 904. RAID engine 402 receives the I/O command error via the standard command/data path, recognizes the failure of a disk drive, and allocates the spare to replace the failed disk drive. The RAID engine now begins reconstruction of data on the spare drive. In addition, to prevent disruption in the I/O operations, the RAID engine writes any new data being sent by the host, concurrent with the reconstruction, with full parity protection.

The powered-on spare disk drive is now used by RAID engine 402 to store data in place of the failed disk drive. The failed disk drive can be physically removed from the storage system. In order to maintain the number of spare disk drives available in the storage system, a new disk drive is inserted in the storage system in place of the removed failed disk drive. In order to update the list of available spare disk drives, which is maintained by disk manager 408, information regarding the addition of a spare disk drive is communicated to disk manager 408. In one embodiment of the present invention, this is done through a user management interface to the disk manager 408. Disk manager 408 detects a new drive by its unique serial number. This information is presented to a user via the user management interface. The user is presented with the option of adding the new drive to the spare disk drive pool. In another embodiment, configuration interface 410 automatically detects the addition of a spare disk drive to the storage system.

Figure 10:
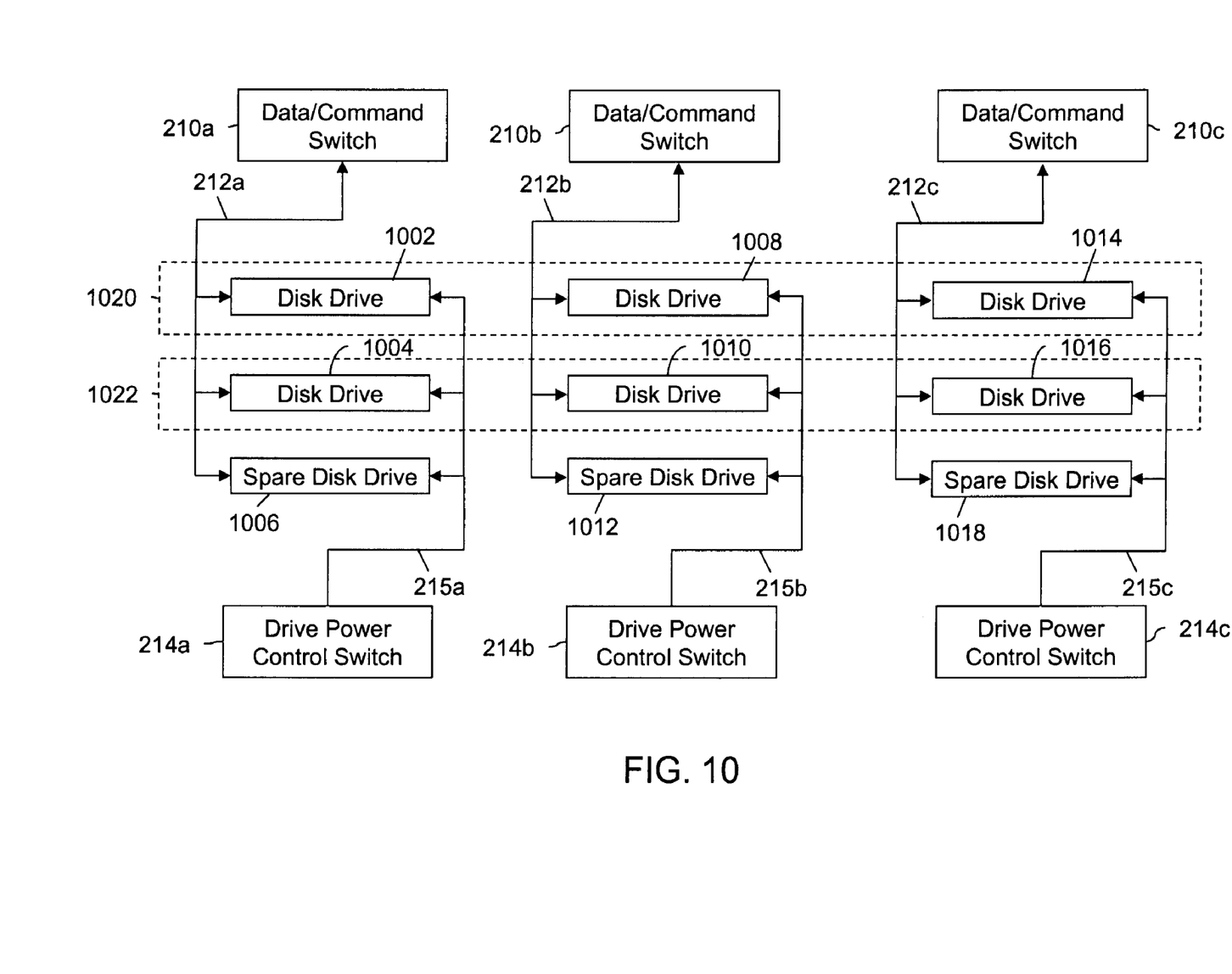
FIG. 10 is a block diagram of an exemplary arrangement of disk drives to form RAID sets in a storage system, in accordance with an embodiment of the present invention.

In an embodiment of the present invention, disk drives 106 are arranged to form multiple RAID sets. FIG. 10 is a block diagram of an exemplary arrangement of disk drives to form RAID sets in storage system 104, in accordance with an embodiment of the present invention. Disk drives 1002, 1004, 1008, 1010, 1014, and 1016 are arranged to form different RAID sets. Disk drives 1002, 1008, and 1014 comprise RAID set 1020. Disk drives 1004, 1010, and 1016 comprise RAID set 1022. Storage system 104 also comprises spare disk drives 1006, 1012, and 1018. These drives are in power-off condition and are used to replace failed disk drives. In this embodiment, disk drives belonging to the same RAID set are distributed in such a way that they are connected to different data and power busses. As shown in FIG. 10, disk drives 1002, 1008, and 1014 of RAID set 1020 are connected to different data/command switches 210a, 210b and 210c and different drive power control switches 214a, 214b, and 214c. In the event of failure of a disk drive, disk manager 408 selects a spare disk drive to replace the failed disk drive so that the spare disk drive is not on the same data and power bus as another member of the RAID set to which the failed disk drive belongs. In case such a spare is not available, the spare selection criteria select a spare disk drive that least affects temperature and vibrations in the vicinity of disk drives belonging to the same RAID set as the failed disk drive. In case these criteria cannot be met, then the last available spare disk drive is selected to replace a failed disk drive. This ensures that, even if an optimal spare disk drive is not selected, a spare disk drive is provided so that no data loss occurs in storage system 104.

The spare selection criteria are explained with reference to FIG. 10. The spare selection criteria cited here with reference to FIG. 10 is only for illustrative purposes and does not limit the scope of the invention, as will be apparent to one skilled in the art. It will also be apparent to one skilled in the art that other additional criteria that are based on specific drive characteristics, such as electrical, mechanical or environmental factors, or the constraints of the RAID storage system can also be included in the spare drive selection criteria. For illustrative purposes, it is considered that disk drive 1002, which is a part of RAID set 1020, fails and disk manager 408 selects spare disk drive 1006 as the candidate spare disk drive. In this case, disk drive 1002 and spare disk drive 1006 are on the same data bus 212a because they are connected to the same data/command switch 210a. They are also on the same power bus 215a because they are connected to the same drive power control switch 214a. Since the candidate spare disk drive is on the same data and power bus as the failed disk drive, it acts as a direct replacement for the failed disk drive. This is because selecting it to replace the failed disk drive will have no effects on the power and data bandwidth available to other disk drives belonging to RAID set 1020.

In another illustrative case, it is considered that disk drive 1002, which is a part of RAID set 1020, fails and disk manager 408 selects spare disk drive 1012 as the candidate spare disk drive. In this case, candidate spare drive 1012 is on the same data and power bus 212b and 215b as disk drive 1008, which is a member of RAID set 1020. Disk manager 408 checks if additional spare disk drives, which can be selected as candidate spare drives to replace the failed disk drive, are available. In case no spare disk drives are available, disk manager 408 selects spare disk drive 1012 to replace failed disk drive 1002. Selecting spare disk drive 1012 to replace failed disk drive 1002 is not preferable because spare disk drive 1012 shares the same data and power bus as disk drive 1008, which is a member of RAID set 1020. If spare disk drive 1012 is selected to replace failed disk drive 1002, two drives of RAID set 1020 will share the same data and power bus. This will reduce bandwidth available to the two drives during simultaneous read/write operations as well and power available to the drives.

An advantage of the present invention is that spare disk drives are powered-on only when a disk drive fails. This helps in reducing the power consumption, heat generation, and vibrations in storage systems. Another advantage is that the selection of a spare disk drive to replace a failed disk drive is done by considering factors such as temperature, vibrations, power loads, and bus loads in the storage system. This further reduces the temperature, vibrations, power loads and bus loads in storage systems. Another advantage of the present invention is that it replaces a failed disk drive on a just in time basis. Once a failed disk drive has been replaced by a spare disk drive, the RAID engine is informed about the failure and replacement. The replacement of the drive can occur transparent to data processing systems 102 performing I/O operations on storage system 104 and, therefore, will not be affected by the failure of the disk drive. In other embodiments, spare drives can be powered on in anticipation of a failure, or upon detection of conditions that could indicate an impending failure (e.g., above normal read/write errors).

In an embodiment, data/command switches 210 have power switching functionality as well as bus multiplexing circuitry. Disk drives 106 are attached to power supply 216 via FETs. The FETs are controlled by an addressable register on data/command switch 210. The register can be read and written by disk manager 408. Bit fields in the register specify the power on or power off condition of each individual disk drive. Each data/command switch has its own power FET control register. Since an individual data/command switch is used to connect multiple disk drives and there are a number of data/command switches connected to disk data/command controller 208, a large number of disk drives can be connected to the system by using a small number of data and power busses.

In an embodiment, data/command switches 210 are in the form of canisters. A canister is a hardware construct that physically holds disk drives 106. Each canister provides a data bus and a power bus for disk drive 106 that are connected to the canister. Each disk drive connected to a canister is addressed by the canister by a rank. Adjacent disk drives on a canister will have consecutive rank numbers. With the help of the rank of a disk drive, a canister can identify neighboring disk drives. Disk drives 106 are also identified by the canister to which they are connected. Therefore, if two disk drives are connected to the same canister, they share the same data and power bus. In this embodiment, disk manager 408 uses the canister and rank associated with each disk drive to address that particular disk drive. Hence, disk manager 408 is able to identify the disk drives sharing the same data and power bus and adjacent disk drives.

In an embodiment of the present invention, RAID engine 402 is embedded in a data processing system that is connected to storage controller interface 202. The data processing system is in turn connected to other data processing systems. RAID engine 402 can be in the form of either software or hardware. This helps in reducing the overhead of the storage system by utilizing a dedicated data processing system that carries out RAID functions.

In an embodiment of the present invention, disk drives 106 are individually powered-on and powered-off depending on their usage. This is controlled by disk manager 408. Disk drives that are not in use for I/O are powered-off if other drives need to be powered on to honor new I/O requests. When data is to be read from or written to disk drives in power-off state, they are powered-on. Disk manager 408 sends commands to drive power control switches 214 to individually power-on and power-off disk drives.

In an embodiment of the present invention, RAID engine 402 is directly connected to hardware driver 406. RAID engine 402 sends data to hardware driver 406, along with physical hardware compatible address of the disk drive on which the data is to be written. In an embodiment of the present invention, drive power control functionality is embedded in disk drives 106. Disk manager 408 electronically switches power to disk drives 408 by means of commands sent to disk drives 106 via data bus 212.

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor. The microprocessor is connected to a communication bus. The computer also includes a memory. Memory may include Random Access Memory (RAM) and Read Only Memory (ROM). The computer system further comprises an array of storage devices. The storage device can be a hard disk drive or a removable storage drive such as a floppy disk drive, optical disk drive and the like. A storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

Although the invention has been described with respect to specific embodiments thereof, these embodiments are merely illustrative, and not restrictive of the invention. For example, although embodiments of the invention have been discussed primarily with respect to spare drive replacement, other systems may desire to replace a drive prior to failure, or upon a condition other than failure, impending failure or predicted failure.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for spare disk drive management in a storage system, the storage system comprising a first set of disk drives in a power-on state, a second set of disk drives in a power-off state, the method comprising:
   detecting failure of a disk drive belonging to the first set of disk drives;
   analyzing location and connectivity to the first set of drives for disk drives in the second set of disk drives, the analysis based on the location and connectivity as applied to one or more spare selection criteria; and
   selecting a spare disk drive from the second set of disk drives based on the analysis of the location and connectivity as applied to the one or more spare selection criteria, wherein the selected spare disk drive is determined based on its location and connectivity to the first set of drives as applied to the one or more spare selection criteria;
   powering-on the selected spare disk drive; and
   replacing the failed disk drive with the selected spare disk drive,
   wherein selecting a spare disk drive further comprises:
   checking bandwidth loads on the first set of disk drives, the bandwidth loads being one spare selection criterion;
   checking power loads on the first set of disk drives, the power loads being one spare selection criterion;
   checking environmental conditions on the first and second set of disk drives, environment condition being one spare selection criterion; and
   determining one spare disk drive from the second set of disk driver that satisfies at least one spare selection criterion.

2. The method as recited in claim 1, wherein selecting a spare disk drive further comprises selecting a spare disk drive not satisfying the spare selection criteria if no spare disk drives from the second set of disk drives satisfy the spare selection criteria.

3. The method as recited in claim 1, wherein selecting a spare disk drive is carried out on a just in time basis.

4. The method as recited in claim 1, wherein replacing further comprises powering-off the failed disk drive.

5. The method as recited in claim 1, wherein replacing further comprises adding the selected spare disk drive to the first set of disk drives.

6. The method as recited in claim 1, wherein replacing further comprises recreating data, which is present on the failed disk drive, on the selected spare disk drive using RAID parity techniques.

7. The method as recited in claim 1, wherein replacing is carried out on a just in time basis.

8. The method as recited in claim 1 further comprising maintaining a list of disk drives belonging to the second set of disk drives in the storage system.

9. The method as recited in claim 8 further comprising removing the selected spare disk drive from the list of disk drives belonging to the second set of disk drives.

10. The method as recited in claim 9 further comprising updating the list on addition of a new spare drive to the storage system.

11. An apparatus for spare disk drive management in a storage system, the storage system comprising a first set of disk drives in power-on state, a second set of spare disk drives in power-off state, the apparatus comprising:
   a hardware driver, the hardware driver detecting the failure of a disk drive from the first set of disk drives;
   a disk manager, the disk manager selecting a spare disk drive from the second set of disk drives to replace the failed disk drive based on spare selection criteria;
   at least one power controller, the power controller switching off the failed disk drive and switching on the selected spare disk drive, wherein the selection criteria comprise:
   bandwidth loads on the first set of disk drives;
   power loads on the first set of disk drives; and
   environmental conditions on the first set of disk drives.

12. The apparatus as recited in claim 11, wherein the storage system comprises at least one redundant array of independent disks (RAID).

13. The apparatus as recited in claim 12 further comprising at least one temperature sensor, the temperature sensor monitoring the temperature near a disk drive from the first set and the second set of disk drives in the storage system to determine environmental conditions for the spare selection criteria.

14. The apparatus as recited in claim 11 further comprising at least one vibration sensor, the vibration sensor monitoring vibrations near a disk drive from the first set and second set of disk drives in the storage system to determine environmental conditions for the spare selection criteria.

15. The apparatus as recited in claim 11 further comprising a configuration manager, the configuration manager comprising means for detecting a new disk drive added to the storage system.

16. The apparatus as recited in claim 11, wherein the disk manager comprises means for detecting an error in a disk drive in the storage system.

17. The apparatus as recited in claim 16 further comprising means for maintaining a list of spare disk drives in power-off state in the storage system.

18. The apparatus as recited in claim 11, wherein the power controller can selectively power off a disk drive based on input from the disk manager.

19. An apparatus for spare disk drive management in a storage system, the storage system comprising a first set of disk drives in power-on state, a second set of spare disk drives in power-off state, the apparatus comprising:
  a. a hardware driver, the hardware driver detecting the failure of a disk drive from the first set of disk drives;
  b. a disk manager, the disk manager selecting a spare disk drive just in time from the second set of disk drives to replace the failed disk drive based on spare selection criteria; the spare selection criteria comprising:
    i. bandwidth loads on the first set of disk drives;
    ii. power loads on the first set of disk drives; and
    iii. environmental conditions on the first set of disk drives;
  c. at least one power controller, the power controller switching off the failed disk drive and switching on the selected spare disk drive;
  d. at least one temperature sensor, the temperature sensor sending the temperature of the disk drives to the disk manager; and
  e. at least one vibration sensor, the vibration sensor sending the vibrations in the vicinity of the disk drives to the disk manager.

20. A computer program product for use with a computer, the computer program product comprising a computer usable medium having a computer readable program code embodied therein for spare disk drive management in a storage system, the storage system comprising a first set of disk drives in power-on state and a second set of disk drives in power-off state, the computer program product performing the steps of:
  detecting failure of a disk drive belonging to the first set of disk drives;
  selecting a spare disk drive from the second set of disk drives based on spare selection criteria;
  powering-on the selected spare disk drive; and
  replacing the failed disk drive with the selected spare disk drive, wherein selecting a spare disk driver further comprises performing the steps of:
  checking bandwidth loads on the first set of disk drives, the bandwidth loads being one spare selection criterion;
  checking power loads on the first set of disk drives, the power loads being one spare selection criterion;
  checking environmental conditions on the first and second set of disk drives, environment condition being one spare selection criterion; and
  determining one spare disk drive from the second set of disk driver that satisfies at least one spare selection criterion.

* * * * *